(12) United States Patent
Tian et al.

(10) Patent No.: US 8,059,914 B2
(45) Date of Patent: Nov. 15, 2011

(54) METHOD AND APPARATUS FOR PREPROCESSING ULTRASOUND IMAGING

(75) Inventors: Yong Tian, Shenzhen (CN); Bin Yao, Shenzhen (CN); Qinjun Hu, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 1071 days.

(21) Appl. No.: 11/869,558

(22) Filed: Oct. 9, 2007

(65) Prior Publication Data

US 2008/0123992 A1     May 29, 2008

(30) Foreign Application Priority Data

Nov. 28, 2006   (CN) .......................... 2006 1 0146989

(51) Int. Cl.
*G06K 9/00* (2006.01)
*G06K 9/36* (2006.01)

(52) U.S. Cl. ........ 382/276; 382/175; 382/181; 382/182; 382/190; 382/202; 382/205; 382/225; 382/278; 382/282; 382/285

(58) Field of Classification Search .......... 382/173–175, 382/181–182, 190, 195, 202–203, 205, 210, 382/225, 276, 278, 282, 285, 299, 308
See application file for complete search history.

(56) References Cited

U.S. PATENT DOCUMENTS

| | | | |
|---|---|---|---|
| 5,413,103 A | 5/1995 | Eckhorn | |
| 5,827,189 A | 10/1998 | Mo et al. | |
| 5,860,928 A | 1/1999 | Wong et al. | |
| 5,899,864 A | 5/1999 | Arenson et al. | |
| 6,001,063 A | 12/1999 | Guracar | |
| 6,289,135 B1* | 9/2001 | Declerck et al. | 382/276 |
| 6,512,993 B2* | 1/2003 | Kacyra et al. | 702/159 |
| 6,685,641 B2 | 2/2004 | Liu | |
| 7,043,290 B2* | 5/2006 | Young et al. | 600/416 |
| 7,272,265 B2* | 9/2007 | Kouri et al. | 382/260 |
| 7,657,299 B2* | 2/2010 | Huizenga et al. | 600/410 |
| 7,778,493 B2* | 8/2010 | Ho et al. | 382/299 |
| 7,920,440 B2* | 4/2011 | Jiang et al. | 367/11 |
| 8,014,625 B2* | 9/2011 | Dewaele | 382/267 |
| 2003/0053697 A1* | 3/2003 | Aylward et al. | 382/203 |
| 2004/0071363 A1* | 4/2004 | Kouri et al. | 382/276 |

FOREIGN PATENT DOCUMENTS

| | | |
|---|---|---|
| CN | 1431624 | 7/2003 |
| CN | 1924926 | 3/2007 |
| CN | 1926674 | 3/2007 |

* cited by examiner

*Primary Examiner* — David A Vanore
(74) *Attorney, Agent, or Firm* — Kory D. Christensen; Stoel Rives LLP

(57) ABSTRACT

The present invention provides a method and module for preprocessing ultrasound imaging. The method comprises a calculation step for constructing a multivalue vector field and a smoothing step for smoothing the whole volume data. The method further comprises a judgement step and minification and magnification steps. The module includes a calculation unit, a smoothing unit, a judgement unit, a minification unit and a magnification unit. According to the method for preprocessing ultrasound imaging, speckle noise can be eliminated effectively by calculating a mean value of a plurality of nodes distributed over the surface, so as to implement the smoothing. Therefore, this method is capable of smoothing data without compromising details.

20 Claims, 4 Drawing Sheets

METHOD AND APPARATUS FOR PREPROCESSING ULTRASOUND IMAGING

STATEMENT OF RELATED APPLICATION

The present application claims priority of the Chinese Patent Application No. 200610146989, entitled "Method and Apparatus for Preprocessing Ultrasound Imaging", filed on Nov. 28, 2006, which is incorporated herein by reference in its entirety.

FIELD OF THE INVENTION

The present invention relates to a method and apparatus for processing an image signal, and specifically to a method for preprocessing ultrasound imaging and an apparatus for implementing the same.

BACKGROUND OF THE INVENTION

A conventional medical imaging equipment can only offer a two-dimensional image of the inside human organs. A doctor can empirically estimate the size and shape of nidus from a plurality of 2D images so as to "conceive" a three-dimensional geometrical relationship between the nidus and its surrounding tissues, which brings difficulty to therapy. A 3D visual technology can reconstruct a 3D image from a series of 2D images and display it on a terminal. Thereby, not only a profile of the imaged object is obtainable directly and vividly, but also a lot of important 3D information is saved. Since the ultrasound imaging has significant advantages over CT, MRI in non-invasion, non-ionizing radiation and operating flexibility etc., the 3D ultrasound imaging has the prospect of being widely in clinic. There exists a need to expand the research on the 3D visual technology in the ultrasound field.

So far, there are two ways to acquire 3D ultrasound volume data: one is to acquire a series of 2D ultrasound images for a tissue with known spatial positions by using an existing 2D ultrasound diagnostic equipment in combination with a locating mechanism so as to finally obtain the 3D volume data in an offline manner; the other is to utilize a 2D matrix array probe to emit ultrasound beams in a pyramid volume so as to acquire real-time 3D volume data.

There have been some mature methods for visualizing 3D volume data. However, speckle noise specific to the ultrasound image has become an important factor influencing the imaging effect, thus limiting its application. The 3D ultrasound volume data consists of a series of ultrasound images. In forming the ultrasound image, reflection echoes from the reflection points whose space is smaller than a wavelength interfere with each other so as to produce the speckle noise, which will blur the image features and disturb observation and analysis. If such a volume data not being processed is used in 3D imaging directly, the resulting visual effect will be unacceptable. The purpose of preprocessing is to filter or smooth the ultrasound volume data to suppress the noise, so that the visualization after preprocessing leads to imaging of good quality, therefore putting 3D ultrasound imaging to the best use.

A filter to reduce speckle artifact in ultrasound imaging is provided in a patent document US005409007A. In this document, a method for preprocessing is described as comprising the following steps: forming for each pixel in an ultrasound image (prior to a scanning conversion, that is, before a digital scan converter) a five-point diamond-shaped template centering at the pixel; calculating a medium gray-scale value of these five pixels; and replacing the original gray-scale value of the central pixel with the medium value, as shown in FIGS. 1 and 2.

The shortcoming of the above-mentioned technology is that it can not be used in 3D application directly. Even though it is extended to 3D application and the size of the template is adjusted, either the noise is significant or the imaging result becomes blurry, unable to smooth the imaging data without compromising important details. Therefore, the prior techniques are not adapted for practical application.

SUMMARY OF THE INVENTION

To overcome the shortcoming in prior art, the present invention provides a method and apparatus to smooth ultrasound volume data without compromising details.

According to the first aspect of embodiments of the present invention, there is provided a method for preprocessing ultrasound imaging, comprising steps of: calculating uniformity of each of line segments centering at current voxel and within a neighborhood centering at the same voxel and having a radius R to select the most uniform N directional lines as 2N tangent vectors and the most nonuniform directional line as a normal line, in order to finally form a multivalue vector field after all voxels are involved in the calculation; and smoothing all volume data of each voxel, further comprising: applying a mean filtering to all gradients in the neighborhood having a radius r, the gradient being the maximum nonuniformity represented by the normal line of each voxel; if the mean filtered gradient for the current voxel is smaller than a predetermined threshold, calculating and assigning the mean gray-scale value of the neighborhood to the current voxel; and, if the mean filtered gradient for the current voxel is not smaller than the predetermined threshold, marching from the current voxel along 2N directions of the multivalue vector field respectively to generate 2N branches in total to finally form a tree-like structure; and calculating a mean gray-scale value of all voxels on the tree-like structure and assigning the mean gray-scale value to the current voxel to realize smoothing of the volume data. Wherein directions at both ends of N directional lines represent 2N tangent vectors; R is 1; r is 1 or 2; N is 2 for the 3D ultrasound image and 1 for the 2D ultrasound image; and the predetermined threshold may be an empirical value for separating background and the object.

According to the method for preprocessing ultrasound imaging of the first aspect of the present invention, the nonuniformity V of the directional line is calculated as follows:

$$V = \frac{1}{2R} \sum_{j=-R}^{R} |G_j - G_0|,$$

where $G_0$ is the gray-scale value for the current voxel; $G_j$ is the gray-scale value for $j^{th}$ voxel in directional line, and the positive and negative values of j represent directions of both ends of the directional line respectively.

According to the first aspect of the present invention, optionally, the method for preprocessing ultrasound imaging further comprises the step of judging whether the current voxel locates near the surface of an object based on its gradient, and if it locates near the surface carrying out the smoothing process on that voxel, otherwise only applying mean filtering to the voxel.

According to the first aspect of the present invention, optionally, the method for preprocessing ultrasound imaging further comprises the steps of, prior to the calculating and smoothing steps, minifying the volume data before a scanning conversion; and magnifying the volume data to the original size after the smoothing step. Preferably, the minification step comprises: for a 3D ultrasound image, applying to the volume data an X·Y·Z mean filtering and then an X·Y·Z sampling, in which X, Y and Z are minification factors in three dimensions respectively; for a 2D ultrasound image, applying to the image data an X·Y mean filtering and then an X Y sampling, in which X and Y are minification factors in two dimensions respectively. Preferably, the magnification step comprises: for the 3D ultrasound image, duplicating every voxel in the volume data into X·Y·Z voxels and then applying to the volume data an X·Y·Z mean filtering, in which X, Y and Z are magnification factors in three dimensions respectively; for the 2D ultrasound image, duplicating every pixel in the image data into X·Y pixels and then applying to the image data an X·Y mean filtering, in which X and Y are magnification factors in two dimensions respectively. A kernel size of the mean filtering during minification or magnification may adopt a value different than X·Y·Z or X·Y.

For the 3D ultrasound image, the neighborhood is a cube having a radius R centering at each voxel, in which R is a distance from the center of the cube to its surface; the directional line is a line segment centering at the current voxel and passing through two voxels on the surface of the cubic neighborhood having the radius R, and the number of the directional lines may be 13 or 9. For a 2D ultrasound image, the neighborhood is a square having a radius R centering at each pixel, in which R is a distance from the center of the square to its side; the directional line is a line segment centering at the current pixel and passing through two pixels on the sides of the square having the radius R, and the number of the directional lines is 4.

According to the second aspect of embodiments of the present invention, there is provided a module for preprocessing ultrasound imaging, comprising: a calculation unit for calculating uniformity of each of line segments centering at current voxel and within a neighborhood centering at the same voxel and having a radius R to select the most uniform N directional lines as 2N tangent vectors and the most nonuniform directional line as a normal line, in order to finally form a multivalue vector field; and a smoothing unit for smoothing volume data of each voxel, which applying a mean filtering to all gradients in the neighborhood having a radius r, the gradient being the maximum nonuniformity represented by the normal line of each voxel; if the mean filtered gradient for the current voxel is smaller than a predetermined threshold, calculating and assigning the mean gray-scale value of the neighborhood to the current voxel; and, if the mean filtered gradient for the current voxel is not smaller than a predetermined threshold, marching from the current voxel respectively along 2N directions of the multivalue vector field to generate 2N branches in total to finally form a tree-like structure; and calculating a mean gray-scale value of all voxels on the tree-like structure and assigning the mean gray-scale value to the current voxel to realize smoothing of the volume data. Wherein directions at both ends of N directional lines represent 2N tangent vectors; R is 1; r is 1 or 2; N is 2 for the 3D ultrasound image and 1 for the 2D ultrasound image; and the predetermined threshold may be an empirical value for separating background and the object.

According to the module for preprocessing ultrasound imaging of the second aspect of the present invention, the nonuniformity V of the directional line is calculated as follows:

$$V = \frac{1}{2R} \sum_{j=-R}^{R} |G_j - G_0|,$$

where $G_0$ is the gray-scale value for the current voxel; $G_j$ is the gray-scale value for $j^{th}$ voxel in directional line, and the positive and negative values of j represent directions of both ends of the directional line respectively.

According to the second aspect of the present invention, optionally, the module for preprocessing ultrasound imaging further comprises a judgement unit for judging whether the current voxel locates near the surface of an object based on its gradient, and if it locates near the surface, the voxel near the surface is subjected to the smoothing process, otherwise it is subjected to the mean filtering only.

According to the second aspect of the present invention, optionally, the module for preprocessing ultrasound imaging further comprises a minification unit for minifying, prior to calculating and smoothing, the volume data before a scanning conversion; and a magnification unit for magnifying the volume data to the original size after smoothing. Preferably, the minification unit, for a 3D ultrasound image, applies to the volume data an X·Y·Z mean filtering and then an X·Y·Z sampling, in which X, Y and Z are minification factors in three dimensions respectively; and, for a 2D ultrasound image, applies to the image data an X·Y mean filtering and then an X Y sampling, in which X and Y are minification factors in two dimensions respectively. Preferably, the magnification unit, for the 3D ultrasound image, duplicates every voxel in the volume data into X·Y·Z voxels and applies to the volume data an X·Y·Z mean filtering, in which X, Y and Z are magnification factors in three dimensions respectively; and, for the 2D ultrasound image, duplicates every pixel in the image data into X·Y pixels and then applies to the image data an X·Y mean filtering, in which X and Y are magnification factors in two dimensions respectively. Wherein the kernal size of the mean filtering during minification or magnification may adopt a value different than X·Y·Z or X·Y.

Wherein the neighborhood is a cube having the radius R centering at each voxel for a 3D ultrasound image, in which R is a distance from the center of the cube to its surface, and the directional line is a line segment centering at the current voxel and passing through two voxels on the surface of the cubic neighborhood having the radius R and the number of the directional lines may be 13 or 9; while the neighborhood is a square having the radius R centering at each pixel for a 2D ultrasound image, in which R is a distance from the center of the square to its side, and the directional line is a line segment centering at the current pixel and passing through two pixels on the sides of the square having the radius R and the number of the directional lines is 4.

According to the method for preprocessing ultrasound imaging adopted in the technical solution of the present invention, on the object's surface in the volume data, the branches of the tangent tree distribute along the surface as much as possible without crossing or breaking away from the surface, which can protect the edge effectively. At the same time, the speckle noise can be eliminated effectively by calculating the mean value of plurality of nodes distributed along the surface, thus achieving the purpose of smoothing. So, this algorithm can give consideration to both smoothness and details.

DETAILED DESCRIPTION OF THE INVENTION

Figure 1:
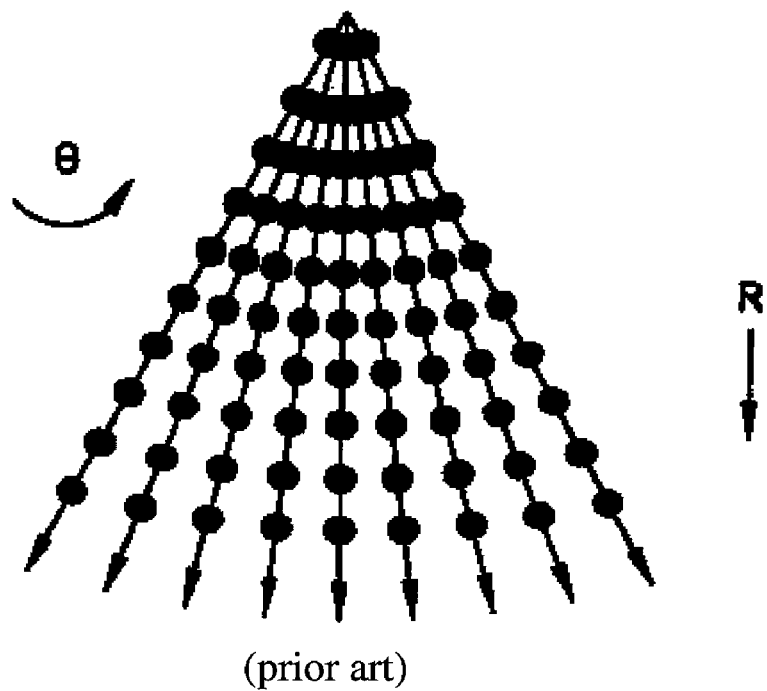
FIG. 1 is a schematic diagram illustrating a format in which a beam former acquires and displays vector scanning data (in prior art)
Figure 2:
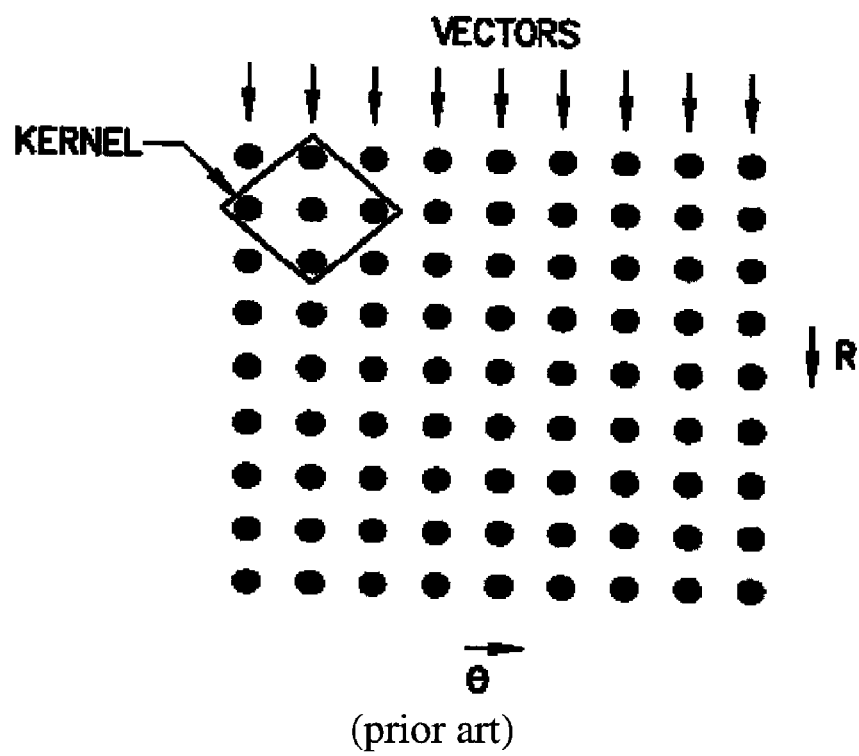
FIG. 2 is a schematic diagram illustrating vector scanning data subjected to a medium filtering in a polar coordinate domain (in prior art)

1. Method for Preprocessing an Ultrasound Image

The method for preprocessing an ultrasound image according to the embodiment of the present invention is described as follows, taking a 3D ultrasound image as an example.

Put it briefly, the method for preprocessing ultrasound imaging according to the embodiment of the present invention first minifies volume data before digital scanning conversion (DSC) and then performs the core algorithm and finally magnifies the data to its original size. In the core algorithm process, a cubic neighborhood is first determined for each voxel, which centers around that voxel and has a "radius" of R ("radius" mentioned herein refers to a distance from the center of the cube to its surface, i.e., the length of the cube's side equals to 2R+1). Subsequently, 13 line segments centering at the current voxel are examined in respect of uniformity. The most uniform N directional lines are then selected to generate 2N optimal directions. After each voxel is involved in the calculation, a multivalue vector field will be obtained. For each voxel, if it has relatively small amplitude of gradient, a mean gray-scale value of its cubic neighborhood is calculated and assigned to the current voxel. Otherwise, by marching from the current voxel S steps along 2N directions of the multivalue vector field, 2N branches are generated by each march, finally forming a tree-like structure. A mean gray-scale value of all voxels on the "tree" is calculated and assigned to the current voxel. The whole volume data is smoothed after all voxels are calculated.

In order to improve the speed and stability of the algorithm, the volume data is subjected to a minification before the core algorithm and a magnification after the core algorithm. In general, the scaling factors X, Y and Z along the three dimensions are integers, which are associated with the scanning spatial state. For example, if the actual voxels are arranged densely in the X direction, the scaling factor X will be large. The scaling factors X, Y and Z also relate to the demand for speed of the algorithm. The higher the speed is demanded, the larger the values of X, Y and Z should be. Minification of volume data is realized by applying an X·Y·Z mean filtering and then an X·Y·Z sampling. This method is superior to a backward mapping in combination with a trilinear interpolation either in speed or in effect. Magnification of volume data is realized by duplicating every voxel in the volume data into X·Y·Z voxels and then applying an X·Y·Z mean filtering. As compared with the backward mapping in combination with a trilinear interpolation, this method has identical effect but a faster speed.

In fact, the kernal size of the mean filtering during minification or magnification is not necessarily X·Y·Z and may be adjusted to different constants or adaptive values, for example, X'·Y'·Z' and X"·Y"·Z", in accordance with experiences, characteristics of the processed volume data (such as data size, scanning depth, brightness of object, noise characteristic etc.) or in accordance with actual requirement, in order to achieve different effects flexibly. Generally, the following expressions should be satisfied: $X' \geq X$, $Y' \geq Y$, $Z' \geq Z$, $X" \geq X$, $Y" \geq Y$, $Z" \geq Z$, said the six expressions independent from each other. When equality is established, there is no special effect; otherwise, there is an additional smoothing effect. This also relates to the mean size of noise granularity in data. The inequality is established when the granularity is generally large. For example, a possible combination is $X=X'=X"=2$, $Y=Y'=Y"=2$, $Z=1$, $Z'=Z"=2$. Additionally, minification and magnification can also be realized by the common backward mapping in combination with trilinear interpolation.

In the core algorithm, it is necessary to first construct a multivalue vector field.

Figure 3:
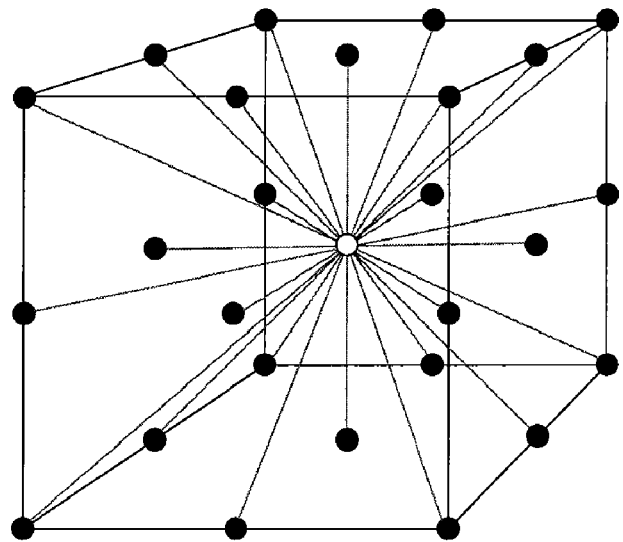
FIG. 3 is a schematic diagram of 13 directional lines taken in preprocessing a 3D ultrasound image according to the embodiment of the present invention, in which R=1 and a white point represents the current voxel and black points are the end of the directional line.

The construction is illustrated as follows:

FIG. 3 shows 13 line segments centering at the current voxel, each passing through two voxels on the surface of the cubic neighborhood having a radius of 1 and in turn traversing the surface of the cubic neighborhood having a radius of from 1 to R. So, there are 13 line segments which are refer to as "directional lines" (there will be 9 directional lines if 4 diagonal directions of the cube are disregarded). Along with the current voxel, each directional line contains 2R+1 voxels, where R=1, the white point represents the current voxel and the black points represent the end of the directional line, as shown in FIG. 3.

For the current voxel, uniformity of each of the directional lines is required to be described for comparison. The uniformity may be computed using conventional calculation formula of variance or gradient. However, the embodiment of the present invention preferably adopts the following formula:

$$V = \frac{1}{2R} \sum_{j=-R}^{R} |G_j - G_0|, \qquad (1)$$

where $G_0$ is the gray-scale value for the current voxel; $G_j$ is the gray-scale value for $j^{th}$ voxel in directional line, and the positive j and negative j represent the directions at both ends of the directional line respectively; V indicates "nonuniformity" of the current directional line, which has the same meaning as the variance. The effect of the current voxel is more significant in the formula (1) as compared with the variance-based calculation. The algorithm of the embodiment of the present invention is by no means inferior in accuracy to the conventional variance-based algorithm, and a lot less complicated.

Figure 4:
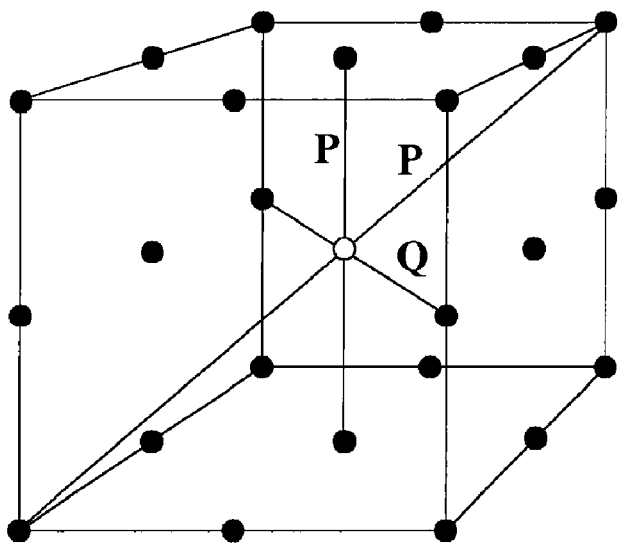
FIG. 4 is an example of N tangent lines and one normal line taken in preprocessing a 3D ultrasound image according to the embodiment of the present invention, in which R=1 and N=2.

Afterwards, the most uniform N directional lines and the most nonuniform one are selected from 13 directional lines of the current voxel, i.e. N directional lines with the minimum V and one with the maximum V. It may be considered that they constitute N tangent lines and one normal line of the volume data at the position of the current voxel. As shown in FIG. 4, R=1, N=2, and Line P indicates the tangent line and Line Q the normal line. The normal line is theoretically perpendicular to the tangent line, but they are not virtually perpendicular to each other in a strict sense because of quantizing effect of the volume data and the configuration of the nonuniformity calculation formula, which one need not get to the bottom of.

Hereunder is described the tangent line, and application of the normal line will be introduced later than that. Since both ends of each directional line point to two directions respectively, totaling 2N "tangent vectors" are obtained actually. If instead of the length of the vector, it is the direction of the vector that is considered, every tangent vector can be represented by a voxel on that vector and closest to the current voxel (that is, the point intersecting the tangent vector with the surface of the cubic neighborhood having a radius of 1). That voxel is referred to as "a locating point" for the current tangent vector of the current voxel.

In the case of the current voxel close to the boundary of the volume data, reducing span of the directional lines may be one of feasible ways to keep the voxels fully within the range of the volume data. After all tangent vectors for all voxels are calculated, a multivalue vector field is formed. Thereafter a smoothing process is performed as follows: marching from the current voxel one step to the 2N locating points based on the value of the multivalue vector field at that voxel; and subsequently marching from each locating point to its 2N locating points based on the value of the multivalue vector field at that locating point. Finally, a tree-like structure with 2N branches, i.e. a 2N-ary tree, is formed.

The above-mentioned tree-like structure is referred to as a "tangent tree" denoted by T; the current voxel O being processed is referred to as a "root node" of T; other voxels traversed by T are referred to as "branch nodes" of T. If a certain branch node C in T can be reached by marching d steps from the current voxel O, d is referred to as the "level" of C; d+1 nodes traversed sequentially from 0 to C are referred to as "path" of C. If the maximum hierarchy of the path is specified as S, it is referred to as "depth" of T, i.e. 0≦d≦S. Evidently, the root node O in the only node with the hierarchy of 0, and the nodes with the hierarchy of d are in total $(2N)^d$. Therefore, the total number of the nodes in T is:

$$M = \sum_{d=0}^{S} (2N)^d = \frac{(2N)^{S+1} - 1}{2N - 1}. \quad (2)$$

Figure 5:
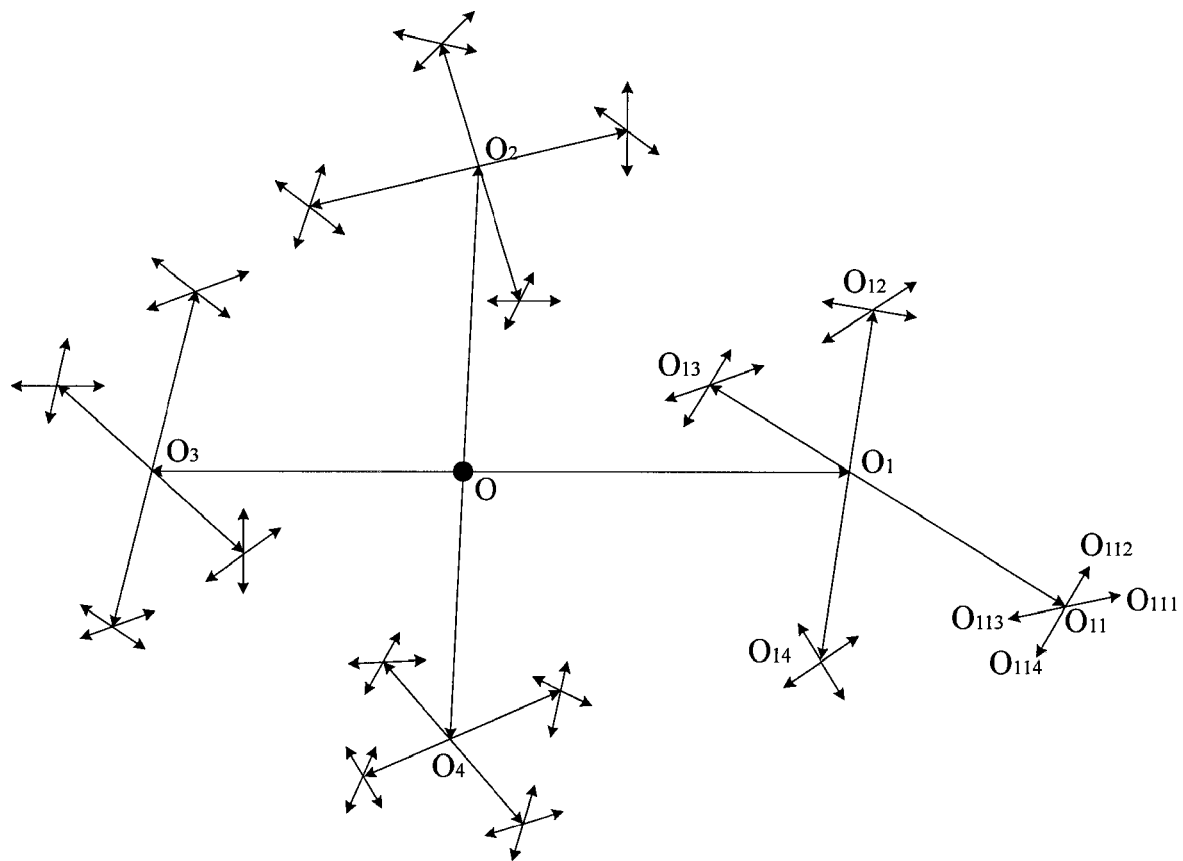
FIG. 5 is an example of a tangent tree according to the embodiment of the present invention, in which 2N=4 and S=3 and the hierarchical relationship of the tangent tree is represented by line segments with different lengths.

FIG. 5 is an example of the tangent tree, in which 2N=4 and S=3. In this example, N and S are determined empirically. In fact, the smaller N and S, the faster the speed of the algorithm, but the result is not smooth enough. On the contrary, the larger N and S, the slower the speed of the algorithm, and the smoother the result but at the cost of some details. In general, N may be a constant 2, but S relates to demand for the speed of the algorithm and the mean size of noise granularity in data, and the larger the speed and the noise granularity, the bigger the value of S. In FIG. 5, 4 nodes $O_1, O_2, O_3, O_4$ are extended when marching from the root node O to its 4 locating points, in which case the hierarchy of each of nodes $O_1, O_2, O_3$ and $O_4$ is 1; and 4 more nodes $O_{11}, O_{12}, O_{13}, O_{14}$ are extended when marching from node $O_1$ to its 4 locating points, in which case the hierarchy is 2; and still 4 more nodes $O_{111}, O_{112}, O_{113}, O_{114}$ are extended when marching from node $O_{11}$ to its 4 locating points, in which case the hierarchy is 3. When the hierarchies for $I_{111}$ etc. have reached the specified depth S, they are no longer extended. Continued in this way, the whole tangent tree with 85 nodes is generated. However, it is required to mention that the different lengths of the line segments in the drawings only indicate the hierarchical relationship of the tree and do not represent the distance covered by each march. Moreover, in marching along the tree branches, it is possible that some positions that have been already covered may be repeatedly traversed. However, no special measure needs taking in this regard. Even though the same position is traversed several times, it is regarded logically as a different node in the tree.

The tree T is already constructed as above mentioned, and a mean gray-scale value of all nodes in T is calculated and assigned to the node O. So far, the current voxel has been smoothed. The smoothed gray-smooth value is:

$$G' = \frac{1}{M} \sum_T G \quad (3)$$

where M is the total number of nodes in the tree T, which is generally calculated according to formula (2). If the current voxel is close to the boundary of the volume data, the tree T can not be extended sufficiently. In this case, the number M of the nodes is smaller than that resultant from the formula (2), but formula (3) is still true. Thus, the mean gray-scale value of all actually extended nodes can be calculated and assigned to the node O.

After the entirety of volume data is involved, the volume data is finished smoothing. This method is referred to as "a tangent tree smoothing algorithm". It can well-protect the edge and eliminate noise without compromising details. However, it is noted that although the tangent tree smoothing algorithm has an ideal smoothing effect, it is relatively complex. If the algorithm is performed on all voxels, it is rather time-consuming. Therefore, the algorithm is optimized as follows:

First, it is judged whether the current voxel locates near the surface of the object based on its amplitude of gradient (hereinafter referred to as "gradient"). Then, the tangent tree operation needs to be performed only when the current voxel locates near the surface (i.e. the region with a large gradient), whereas the other regions (inside the object or on the background, i.e. the region with small gradient) only demand a mean filtering operation. Since the mean filtering is done very fast and the proportion of the voxels near the object's surface in the volume data is usually small, the speed of the algorithm can be improved significantly. Moreover, since only the voxels near the object's surface have many characteristics and play a leading role in imaging, there is little effect on the smoothing result. Of course, the tangent tree algorithm still applies in case of a small gradient, where the depth S of the current tangent tree can be decreased or maintained constant.

Considering that the normal line for each voxel has been obtained when constructing a multivalue vector field and V value of the normal line represents the maximum nonuniformity among all directional lines of the current voxel, V can be approximated as the gradient of the current voxel. For the present embodiment, this method is by no means less accurate than that of a gradient-based calculation, and moreover the amount of calculation is much less complicated by taking advantage of the above-obtained results.

In order to avoid effect of noise and sharp edge on the gradient calculation, the whole gradient values are undergone mean filtering in the cubic neighborhood with a radius of r after the gradients of all voxels in the volume data are calculated. A threshold H may be established in accordance with experience. If the gradient of the current voxel (having been filtered) is smaller than H, the mean gray-scale value of the volume data in the cubic neighborhood of the current voxel having a radius of R' is used as the smoothing result of the current voxel. By experience, r may be 1 or 2 (r relates to mean size of noise granularity in data, and the larger the mean size, the larger the value of r, but r generally may not exceed 2). R' may be the extent R of directional lines (i.e. the radius R of the neighborhood) and H may be an empirical threshold value for segmenting background and the object. If the gradient of the current voxel (having been filtered) is not smaller than H, the tangent tree smoothing algorithm introduced above is performed.

After all voxels in the volume data are judged and processed as mentioned above, the smoothing process is finished. By this, the total preprocessing for the volume data has been accomplished.

Figure 6:
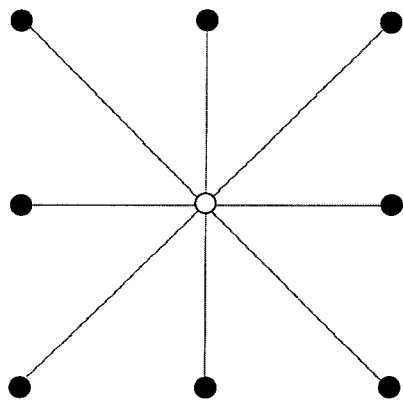
FIG. 6 is a schematic diagram of 4 directional lines taken in preprocessing a 2D ultrasound image according to the embodiment of the present invention.

When the processed object is a 2D ultrasound image, the neighborhood is a square. The number of the alternative directional lines will decrease from 13 to 4, and the number of the optimal directional lines from N to 1. The other changes are simple dimensionality reduction, as shown in FIG. 6.

2. Module for Preprocessing an Ultrasound Image

Figure 7:
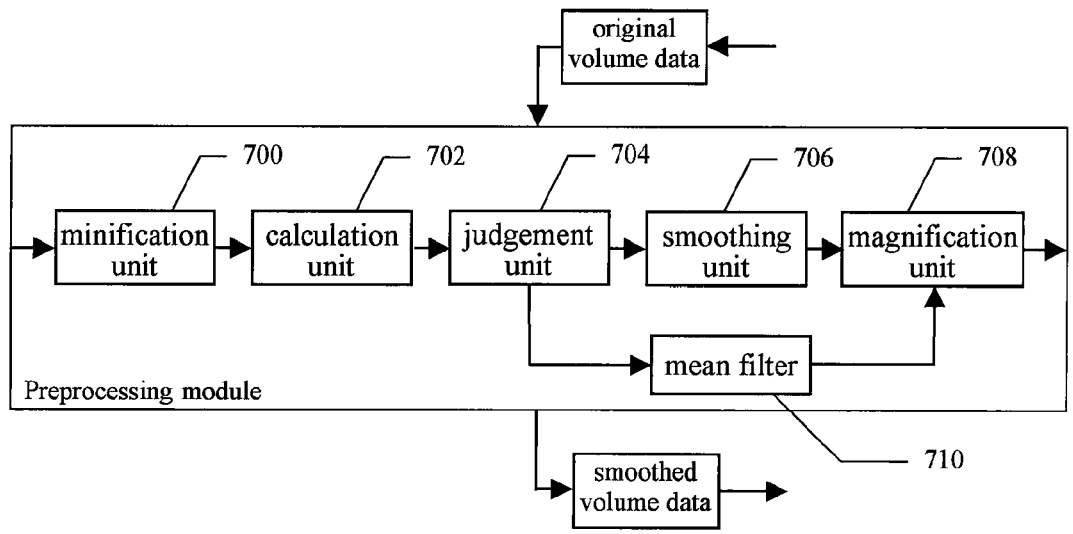
FIG. 7 is a block diagram of a module for preprocessing an ultrasound image according to the embodiment of the present invention.

FIG. 7 shows a module for preprocessing an ultrasound image according to the embodiment of the present invention, comprising a minification unit 700, a calculation unit 702, a judgement unit 704, a smoothing unit 706 and a magnification unit 708 which are sequentially connected, and a branch for mean filter 710. First, the original volume data is processed by the minification unit 702 to obtain the minified volume data. Then, uniformity of each of the directional lines centering at the current voxel in the neighborhood with a radius R centering at the current voxel is calculated by the calculation unit 704. The most uniform N directional lines are selected as 2N tangent vectors and the most nonuniform directional line as a normal line. A multivalue vector field can be obtained after all voxels are calculated. Afterwards, the judgement unit 704 judges whether or not the voxel locates near the surface of the object. If it is, that voxel gets smoothed by the smoothing unit 706; if not, that voxel is subject to mean filter 710. The minified volume data is smoothed after processing all voxels. Finally, the result is magnified to the original size by the magnification unit 708 to obtain the smoothed volume data.

Figure 8:
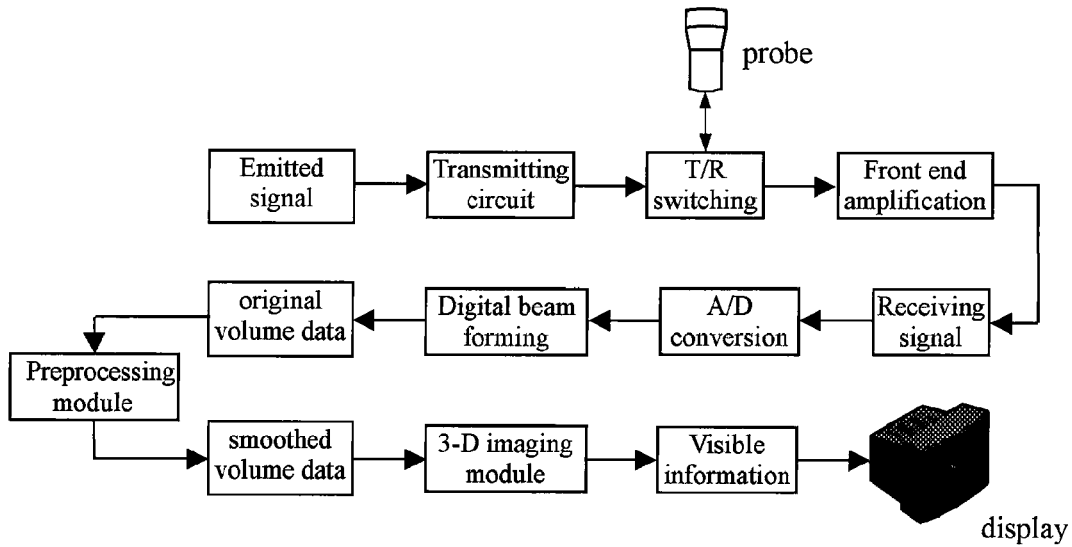
FIG. 8 is schematic diagram of the usage of the module for preprocessing an ultrasound image according to the embodiment of the present invention, which shows the full process from a probe scanning to displaying a 3D image.

FIG. 8 is schematic diagram of the usage of the module for preprocessing an ultrasound image according to the embodiment of the present invention, which shows the full process from a probe scanning to displaying a 3D image. At the front end, a set of focus delayed pulses is transmitted to a probe via a transmitting circuit so as to emit an ultrasound wave; after a period of time delay, the probe receives the ultrasound wave reflected by human body and transforms it into an electrical signal by means of the piezoelectric effect. The electric signal is magnified at the front end and converted into a digital signal by an A/D converter to obtain the original volume data that is saved in a memory. At the rear end, the original volume data is passed through the preprocessing module to obtain the smoothed volume data. The smoothed volume data may be finally displayed on the display apparatus after being processed by a 3D imaging module.

The invention claimed is:

1. A method for preprocessing ultrasound imaging, comprising the steps of:
    calculating uniformity of each of line segments centering at current voxel and within a neighborhood centering at the same voxel and having a radius R to select the most uniform N directional lines as 2N tangent vectors and the most nonuniform directional line as a normal line, in order to finally form a multivalue vector field after all voxels are involved in the calculation; and
    smoothing all volume data of each voxel, further comprising: applying a mean filtering to all gradients in the neighborhood having a radius r; the gradient being the maximum nonuniformity represented by the normal line of each voxel; if the mean filtered gradient for the current voxel is smaller than a predetermined threshold, calculating and assigning the mean gray-scale value of the neighborhood to the current voxel; and, if the mean filtered gradient for the current voxel is not smaller than the predetermined threshold, marching from the current voxel along 2N directions of the multivalue vector field respectively to generate 2N branches in total to finally form a tree-like structure; and calculating a mean gray-scale value of all voxels on the tree-like structure and assigning the mean gray-scale value to the current voxel to realize smoothing of the volume data.

2. The method according to claim 1, further comprising the step of:
    judging whether the current voxel locates near the surface of an object based on its gradient, and if it locates near the surface carrying out the smoothing process on that voxel, otherwise only applying mean filtering to the voxel.

3. The method according to claim 1, further comprising the steps of:
    prior to the calculating and smoothing steps, minifying the volume data before a scanning conversion; and
    magnifying the volume data to the original size after the smoothing step.

4. The method according to claim 3, wherein the minifying step comprises:
    for a 3D ultrasound image, applying to the volume data an X·Y·Z mean filtering and then an X·Y·Z sampling, in which X, Y and Z are minification factors in three dimensions respectively; for a 2D ultrasound image, applying to image data an X·Y mean filtering and then an X·Y sampling, in which X and Y are minification factors in two dimensions respectively; and
    wherein the magnifying step comprises:
    for the 3D ultrasound image, duplicating every voxel in the volume data into X·Y·Z voxels and then applying to the volume data an X·Y·Z mean filtering, in which X, Y and Z are magnification factors in three dimensions respectively; for the 2D ultrasound image, duplicating every pixel in the image data into X·Y pixels and then applying to the image data an X·Y mean filtering, in which X and Y are magnification factors in two dimensions respectively.

5. The method according to claim 4, wherein a kernal size of the mean filtering during minification or magnification may adopt a value different than X·Y·Z or X·Y.

6. The method according to claim 1, wherein directions at both ends of N directional lines represent 2N tangent vectors.

7. The method according to claim 1, wherein R is 1; r is 1 or 2; N is 2 for the 3D ultrasound image and 1 for the 2D ultrasound image; and the predetermined threshold may be an empirical value for separating background and the object.

8. The method according to claim 1, wherein the nonuniformity V of the directional line is calculated as follows:

$$V = \frac{1}{2R} \sum_{j=-R}^{R} |G_j - G_0|$$

where $G_0$ is the gray-scale value for the current voxel; and $G_j$ is the gray-scale value for $j^{th}$ voxel in directional line, the positive and negative j representing the directions at both ends of the directional line respectively.

9. The method according to claim 1, wherein the neighborhood is a cube having a radius R centering at each voxel for a 3D ultrasound image, in which R is a distance from the center of the cube to its surface; while, for a 2D ultrasound image, the neighborhood is a square having a radius R centering at each pixel, in which R is a distance from the center of the square to its side.

10. The method according to claim 9, wherein:
for the 3D ultrasound image, the directional line is a line segment centering at the current voxel and passing through two voxels on the surface of the cubic neighborhood having the radius R, and the number of the directional lines may be 13 or 9;
for the 2D ultrasound image, the directional line is a line segment centering at the current pixel and passing through two pixels on the sides of the square having the radius R, and the number of the directional lines is 4.

11. A module for preprocessing ultrasound imaging, comprising:
a calculation unit for calculating uniformity of each of line segments centering at current voxel and within a neighborhood centering at the same voxel and having a radius R to select the most uniform N directional lines as 2N tangent vectors and the most nonuniform directional line as a normal line, in order to finally form a multivalue vector field; and
a smoothing unit for smoothing volume data of each voxel, which applying a mean filtering to all gradients in the neighborhood having a radius r, the gradient being the maximum nonuniformity represented by the normal line of each voxel; if the mean filtered gradient for the current voxel is smaller than a predetermined threshold, calculating and assigning the mean gray-scale value of the neighborhood to the current voxel; and, if the mean filtered gradient for the current voxel is not smaller than a predetermined threshold, marching from the current voxel respectively along 2N directions of the multivalue vector field to generate 2N branches in total to finally form a tree-like structure; and calculating a mean gray-scale value of all voxels on the tree-like structure and assigning the mean gray-scale value to the current voxel to realize smoothing of the volume data.

12. The module according to claim 11, further comprising:
a judgement unit for judging whether the current voxel locates near the surface of an object based on its gradient, and if it locates near the surface, the voxel near the surface is subjected to the smoothing process, otherwise it is subjected to the mean filtering only.

13. The module according to claim 11, further comprising:
a minification unit for minifying, prior to calculating and smoothing, the volume data before a scanning conversion; and a magnification unit for magnifying the volume data to the original size after smoothing.

14. The module according to claim 13, wherein:
the minification unit, for a 3D ultrasound image, applies to the volume data an X·Y·Z mean filtering and then an X·Y·Z sampling, in which X, Y and Z are minification factors in three dimensions respectively; and, for a 2D ultrasound image, applies to image data an X·Y mean filtering and then an X·Y sampling, in which X and Y are minification factors in two dimensions respectively;
the magnification unit, for the 3D ultrasound image, duplicates every voxel in the volume data into X·Y·Z voxels and applies to the volume data an X·Y·Z mean filtering, in which X, Y and Z are magnification factors in three dimensions respectively; and, for the 2D ultrasound image, duplicates every pixel in the image data into X·Y pixels and then applies to the image data an X·Y mean filtering, in which X and Y are magnification factors in two dimensions respectively.

15. The module according to claim 14, wherein a kernal size of the mean filtering during minification or magnification may adopt a value different than X·Y·Z or X·Y.

16. The module according to claim 11, wherein directions at both ends of N directional lines represent 2N tangent vectors.

17. The module according to claim 11, wherein R is 1; r is 1 or 2; N is 2 for the 3D ultrasound image and 1 for the 2D ultrasound image; and the predetermined threshold may be an empirical value for separating background and the object.

18. The module according to claim 11, wherein the nonuniformity V of the directional line is calculated as follows:

$$V = \frac{1}{2R} \sum_{j=-R}^{R} |G_j - G_0|$$

where $G_0$ is the gray-scale value for the current voxel; and $G_j$ is the gray-scale value for $j^{th}$ voxel in directional line, the positive and negative j representing the directions at both ends of the directional line respectively.

19. The module according to claim 11, wherein the neighborhood is a cube having the radius R centering at each voxel for a 3D ultrasound image, in which R is a distance from the center of the cube to its surface; the neighborhood is a square having the radius R centering at each pixel for a 2D ultrasound image, in which R is a distance from the center of the square to its side.

20. The module according to claim 19, wherein:
for the 3D ultrasound image, the directional line is a line segment centering at the current voxel and passing through two voxels on the surface of the cubic neighborhood having the radius R and the number of the directional lines may be 13 or 9;
for the 2D ultrasound image, the directional line is a line segment centering at the current pixel and passing through two pixels on the sides of the square having the radius R and the number of the directional lines is 4.

* * * * *